US008412723B2

(12) United States Patent
Wolman (10) Patent No.: US 8,412,723 B2
(45) Date of Patent: Apr. 2, 2013

(54) GEOMETRIZATION FOR PATTERN RECOGNITION, DATA ANALYSIS, DATA MERGING, AND MULTIPLE CRITERIA DECISION MAKING

(76) Inventor: Abel Wolman, White Salmon, WA (US)

(*) Notice: Subject to any disclaimer, the term of this patent is extended or adjusted under 35 U.S.C. 154(b) by 23 days.

(21) Appl. No.: 13/239,264

(22) Filed: Sep. 21, 2011

(65) Prior Publication Data

US 2012/0011135 A1    Jan. 12, 2012

Related U.S. Application Data

(60) Division of application No. 12/979,704, filed on Dec. 28, 2010, now Pat. No. 8,055,677, which is a continuation of application No. 11/737,063, filed on Apr. 18, 2007, now Pat. No. 7,885,966, which is a continuation of application No. 10/632,000, filed on Jul. 30, 2003, now Pat. No. 7,222,126.

(60) Provisional application No. 60/399,122, filed on Jul. 30, 2002, provisional application No. 60/426,792, filed on Nov. 18, 2002.

(51) Int. Cl.
*G06F 17/30* (2006.01)
(52) U.S. Cl. ........................................ 707/756
(58) Field of Classification Search .................. 707/756, 707/748, 798, 968; 382/133, 181, 159, 170, 382/224, 280, 281; 706/20
See application file for complete search history.

(56) References Cited

U.S. PATENT DOCUMENTS

| | | | |
|---|---|---|---|
| 5,175,710 A | 12/1992 | Hutson | |
| 5,181,259 A | 1/1993 | Rorvig | |
| 5,235,506 A | 8/1993 | O'Brien, Jr. | |
| 5,245,587 A | 9/1993 | Hutson | |
| 5,321,613 A | 6/1994 | Porter et al. | |
| 5,348,020 A | 9/1994 | Hutson | |
| 5,402,335 A | 3/1995 | O'Brien | |
| 5,422,961 A | 6/1995 | Simard | |
| 5,437,279 A | 8/1995 | Gray | |
| 5,490,516 A | 2/1996 | Hutson | |
| 5,574,837 A | 11/1996 | Clark et al. | |

(Continued)

FOREIGN PATENT DOCUMENTS

| | | |
|---|---|---|
| WO | WO99/34316 | 7/1999 |
| WO | WO00/39705 | 7/2000 |

OTHER PUBLICATIONS

Baird, J. C. and Noma, E., Fundamentals of Scaling and Psychophysics, 1978, pp. 177-205, John Wiley & Sons, Inc., USA.

(Continued)

*Primary Examiner* — Diane Mizrahi
(74) *Attorney, Agent, or Firm* — Marger Johnson & McCollom, P.C.

(57) ABSTRACT

An analyzer/classifier/synthesizer/prioritizing tool for data comprises use of an admissible geometrization process with data transformed and partitioned by an input process into one or more input matrices and one or more partition classes and one or more scale groups. The data to be analyzed/classified/synthesized/prioritized is processed by an admissible geometrization technique such as 2-partition modified individual differences multidimensional scaling (2p-IDMDS) to produce at least a measure of geometric fit. Using the measure of geometric fit and possibly other 2p-IDMDS output, a back end process analyzes, synthesizes, classifies, and prioritizes data through patterns, structure, and relations within the data.

22 Claims, 2 Drawing Sheets

U.S. PATENT DOCUMENTS

| | | | |
|---|---|---|---|
| 5,579,766 | A | 12/1996 | Gray |
| 5,596,644 | A | 1/1997 | Abel et al. |
| 5,602,938 | A | 2/1997 | Akiyama et al. |
| 5,625,767 | A | 4/1997 | Bartell et al. |
| 5,706,402 | A | 1/1998 | Bell |
| 5,729,451 | A | 3/1998 | Gibbs et al. |
| 5,802,207 | A | 9/1998 | Huang |
| 5,987,094 | A | 11/1999 | Clarke et al. |
| 6,262,818 | B1 | 7/2001 | Cuche et al. |
| 6,332,034 | B1 | 12/2001 | Makram-Ebeid et al. |
| 6,546,117 | B1 | 4/2003 | Sun et al. |
| 6,606,624 | B1 | 8/2003 | Goldberg |
| 6,684,206 | B2 | 1/2004 | Chen et al. |
| 6,941,287 | B1 | 9/2005 | Vaidyanathan et al. |
| 6,968,342 | B2 | 11/2005 | Wolman et al. |
| 6,993,186 | B1 | 1/2006 | Glickman et al. |
| 7,221,490 | B2 | 5/2007 | Coppola et al. |
| 7,222,126 | B2 | 5/2007 | Wolman |
| 2003/0189731 | A1 | 10/2003 | Chang |
| 2005/0146714 | A1 | 7/2005 | Kitamura et al. |
| 2006/0133694 | A1 | 6/2006 | Dewaele |
| 2006/0258018 | A1 | 11/2006 | Curl et al. |
| 2007/0198553 | A1 | 8/2007 | Wolman |
| 2009/0075257 | A1 | 3/2009 | Pollock et al. |
| 2012/0296619 | A1* | 11/2012 | Maliassov et al. ............... 703/10 |
| 2012/0304193 | A1* | 11/2012 | Archer et al. ................ 718/105 |

OTHER PUBLICATIONS

Borg, I. and Groenen, P., Modern Multidimensional Scaling: Theory and Applications, Springer, New York, 1997, pp. 15-27 and 159-173.
Carroll, J. D. and Chang, J., Analysis of Individual Differences in Multidimensional Scaling Via an N-Way Generalization of "Eckart-Young" Decomposition, Psychometrika, vol. 35, No. 3., Sep. 1970, pp. 283-319.
Commandeur, J. and Heiser, W., Mathematical Derivations in the Proximity Scaling (PROXSCAL) of Symmetric Data Matrices, Tech. Report 99-93-03, University of Leiden: Department of Data Theory, 1999, pp. 1-73.
Cunningham, J. P. and Shepard, R. N., Monotone Mapping of Similarities into a General Metric Space, Journal of Mathematical Psychology, vol. 11, 1974, pp. 335-363.
De Leeuw, J. and Heiser, W., Theory of Multidimensional Scaling, Handbook of Statistics, vol. 2, North-Holland Publishing Company, 1982, pp. 285-315.
Fang, W., Disagreement degree of multi-person judgements in an additive structure, Mathematical Social Sciences 28, 1994, pp. 85-111, Elsevier Science B.V.
Gifi, A., Algorithm Descriptions for Anacor, Homals, Princals, and Overals, University of Leiden: Department of Data Theory, Tech Report No. RR-89-01, 1989.
Goodhill, G., et al., An evaluation of the use of Multidimensional Scaling for understanding brain connectivity, Philosophical Transactions of the Royal Society, Series B, Research Paper EUCCS RP-63, Jun. 1994, Edinburgh, UK.
Kendall, D., Seriation from abundance matrices, Mathematics in the Archaeological and Historical Sciences, 1971, pp. 215-251, Edinburgh University Press, Edinburgh.
Lingoes, J., Geometric Representations of Relational Data, Mathesis Press, Ann Arbor, 1979, pp. 313-317, 529-539, and 791-815.
McGee, V., The Multidimensional Analysis of 'Elastic' Distances, The British Journal of Mathematical and Statistical Psychology, Nov. 1966, pp. 181-196, vol. 19, Part 2.
McGee, V., Multidimensional Scaling of N Sets of Similarity Measures: A Nonmetric Individual Differences Approach, Multivariate Behavioral Research, 1968, pp. 233-248, vol. 3, Issue 2.
Mielke, P. and Berry, K., Permutation Methods: A Distance Function Approach, 2001, pp. 32-36, Springer, New York, New York.
Narens, L., Theories of Meaningfulness, 2002, pp. 45-56, Lawrence Erlbaum Associates, Manhwah, New Jersey.
Osborne, D., Further Extensions of a Theorem of Dimensional Analysis, Journal of Mathematical Psychology, 1970, pp. 236-242, vol. 7.
Ovchinnikov, S., Means on Ordered Sets, Mathematical Social Sciences, 1996, pp. 39-56, vol. 32.
Perreault, W. and Young, F., Alternating Least Squares Optimal Scaling: Analysis of Nonmetric Data in Marketing Research, Journal of Marketing Research, Feb. 1980, pp. 1-13, vol. 17, No. 1.
Roberts, F., Limitation on Conclusions Using Scales of Measurement, Handbooks in OR & MS, 1994, pp. 621-669, Elsevier Science, New York.
Saaty, T., The Analytic Hierarchy Process: Planning, Priority Setting, Resource Allocation, 1980, pp. a19-a24, McGraw-Hill, New York, New York.
Schiffman, S., et al., Introduction to Multidimensional Scaling, Academic Press, 1981, pp. 74-82 and 321-333.
Siegel, S. and Castellan, J., Nonparametric Statistics for the Behavioral Sciences, 2nd Edition, 1988, 22-36, McGraw-Hill, Boston.
Sinha, D., et al., General Class of Aggregation Operators with Applications to Information Fusion in Distributed Systems, Conference Proceedings, IEEE International Conference on Systems, Man and Cybernetics, 1989, pp. 22-36, Cambridge, Massachusetts.
Stevens, S., On the Theory of Scales of Measurement, Science, Jun. 1946, pp. 677-680, vol. 103, No. 2684.
Takane, Y. and Young, F., Nonmetric Individual Difference Multidimensional Scaling: An Alternating Least Squares Method with Optimal Scaling Features, Psychometrikam Mar. 1977, pp. 7-67, vol. 42, No. 1.
Wish, M. and Carroll, J., Multidimensional Scaling and its Applications, Handbook of Statistics, vol. 2, 1982, pp. 317-345, North-Holland Publishing Company.
Young, M., The Organization of Neural Systems in the Primate Cerebral Cortex, The Royal Society Proceedings: Biological Science, 1993, pp. 13-18, vol. 252.
Zhou, Y. and Leung, H., A Linearly Constrained Least Squares Approach for Multisensor Data Fusion, SPIE, 1997, pp. 118-129, vol. 3067.

* cited by examiner

FIG. 1

GEOMETRIZATION FOR PATTERN RECOGNITION, DATA ANALYSIS, DATA MERGING, AND MULTIPLE CRITERIA DECISION MAKING

RELATED APPLICATIONS

This application is a division of U.S. application Ser. No. 12/979,704, filed Dec. 28, 2010, now U.S. Pat. No. 8,055,677, issued Nov. 8, 2011, which is a continuation of U.S. application Ser. No. 11/737,063, filed Apr. 18, 2007, now U.S. Pat. No. 7,885,966 B2, issued Feb. 8, 2011, which is a continuation of U.S. application Ser. No. 10/632,000, filed Jul. 30, 2003, now U.S. Pat. No. 7,222,126, issued May 22, 2007, which claims the benefit of Provisional Patent Application Ser. No. 60/399,122, filed Jul. 30, 2002, and Provisional Patent Application Ser. No. 60/426,792, filed Nov. 18, 2002, all of which are incorporated by reference.

This application further relates to U.S. patent application Ser. No. 09/581,949, filed Jun. 19, 2000, now U.S. Pat. No. 6,993,186, issued Jan. 31, 2006, and to U.S. patent application Ser. No. 09/885,342, filed Jun. 19, 2001, now U.S. Pat. No. 6,968,342, issued Nov. 22, 2005, both of which are incorporated by reference.

BACKGROUND OF THE INVENTION

U.S. patent application Ser. No. 09/581,949 (hereafter USPA-1) discloses an energy minimization technique for pattern recognition and classification. In U.S. patent application Ser. No. 09/885,342 (hereafter USPA-2), this energy minimization technique is extended to a method for aggregation of ordinal scale data.

PCT international application number PCT/US98/27374, filed Dec. 23, 1998, and designating the United States, PCT international application number PCT/US99/08768, filed Apr. 21, 1999, and designating the U.S. Provisional Patent Application Ser. No. 60/399,122, filed 30, Jul., 2002, and U.S. Provisional Patent Application Ser. No. 60/426,792, filed 18, Nov., 2002, are incorporated herein by reference. The first incorporated application discloses an energy minimization technique for classification, pattern recognition, sensor fusion, data compression, network reconstruction, and signal processing. The incorporated application shows a data analyzer/classifier that comprises using a preprocessing step, an energy minimization step, and a postprocessing step to analyze and classify data. In a particular embodiment, the energy minimization is performed using IDMDS. The second application discloses a technique for merging ordinal data. In a particular embodiment, the merging process is performed using unconditional or matrix conditional, non-metric (ordinal) IDMDS. The third incorporated application discloses a modified energy minimization technique for improved and expanded classification, pattern recognition, sensor fusion, data compression, network reconstruction, and signal processing. The third application additionally discloses a meaningful scale conversion and aggregation process for intermixed scale type data. The fourth incorporated application discloses a 2-phase technique for scale conversion and aggregation of possibly intermixed scale type data.

SUMMARY OF THE INVENTION

Merging data includes receiving input data for merging, defining one or more transformations of the input data, defining a partition of the input data, applying admissible geometrization to the one or more transforms of the input data and the partition of the input data, producing at least an admissible transformation of the input data, and merging the input data using at least the admissible transformation of the input data.

DETAILED DESCRIPTION OF THE PREFERRED EMBODIMENT

By way of illustration only, an analyzer, classifier, synthesizer, measuring, and prioritizing process for data comprises using admissible geometrization with quantitative/qualitative/intermixed scale type data will be described and illustrated. The data to be analyzed, classified, measured, merged, or prioritized is processed using admissible geometrization to produce an element of admissible geometric fit. Using the element of admissible geometric fit and optionally other output of admissible geometrization, the data are analyzed, classified, synthesized, measured, or prioritized. The discussion of one or more embodiments herein is presented only by way of illustration. Nothing shall be taken as a limitation on the following claims, which define the scope of the invention.

The present disclosure relates generally to recognition, classification, measurement, synthesis, and analysis of patterns in real world entities, events, and processes. It further relates to an iterative method for measurement or scale conversion and fusion of data from multiple sources and possibly intermixed scale types resulting in a quantitative merged value, index, or score. It also relates to an iterative method for multiple criteria decision making (MCDM) over mixtures of tangible, objective, quantitative data and intangible, subjective, qualitative data.

The present disclosure further extends and improves the techniques disclosed in U.S. patent application Ser. No. 09/581,949 and U.S. patent application Ser. No. 09/885,342. These extensions and improvements include disclosure of a general, and therefore more useful, procedure for admissible geometrization of data allowing recognition, classification, conversion and synthesis of intermixed scale type data and a method for meaningful multiple criteria decision making. Additional extensions and improvements of the present disclosure can include, but are not limited to, the utilization of arbitrary energy decompositions, double data partitions, novel application of optimization constraints, and resampling or averaging methods for data analysis, smoothing and process invariance.

The disclosures of USPA-1 and USPA-2 are based on minimization of the energy functional $$E(f_1, \ldots, f_m, X_1, \ldots, X_m) = \sum_{k=1}^{m} \sum_{i<j} w_{ijk} (f_k(c_{ijk}) - d_{ij}(X_k))^2,$$

over transformations $f_k$ and configurations $X_k \subseteq R^N = \{R^N, d\}$, N-dimensional real Euclidean space, subject to the constraints $$X_k = ZA_k,$$

where Z is a reference configuration and the $A_k$ are diagonal matrices. The $w_{ijk}$ are proximity weights associated to the raw or initial data values $c_{ijk}$.

In USPA-1 and USPA-2, the matrices $A_k$ in the constraint equation $X_k=ZA_k$ are diagonal. In an embodiment of the present invention, the matrices $A_k$ can be arbitrary nonsingular and reduced rank transformations of the reference configuration Z. This includes the case of diagonal $A_k$ and nonsingular matrices $A_k$ that can be decomposed as the product of a rotation matrix $Q_k$ and a diagonal matrix $T_k$.

$$X_k = ZA_k = ZQ_kT_k.$$

Allowing rotations $Q_k$ in the constraint equation improves the rotational invariance of embodiments under the present invention as compared to USPA-1 and USPA-2.

As disclosed in USPA-1, minimization of E with diagonal matrices $A_k$ corresponds to the INDSCAL model of individual differences multidimensional scaling (IDMDS). Minimizing E with the above more general constraints defines the general IDIOSCAL and PARAFAC models of multidimensional scaling (MDS) (see de Leeuw, J. and Heiser, W., "Theory of multidimensional scaling," in P. R. Krishnaiah and L. N. Kanal, Eds., *Handbook of Statistics*, Vol. 2. North-Holland, N.Y., 1982). A preferred embodiment of the present invention greatly expands the applicability of the INDSCAL, IDIOSCAL, and PARAFAC models of IDMDS.

In addition to the constraints imposed by the above constraint equations, embodiments of the present invention make use of internally constraining the reference configuration Z. These internal constraints consist of holding none, a portion, or all of the points in Z fixed during the minimization of the energy functional.

While the energy E is a mathematical descriptor and does not represent and is not intended to represent an actual physical energy, it is intuitively useful to observe that the total energy of an idealized physical network of nodes connected by i massless springs is given by the formula $$E_{spring} = \frac{1}{2}\sum_i k_i(L_i - L_{ei})^2,$$

where $k_i$ is the spring constant, $L_i$ the spring length, and $L_{ei}$ the equilibrium spring length for spring i. The energy functional E is analogous to the spring energy $E_{spring}$ for m coupled spring networks. With this interpretation, the initial and $f_k$ transformed data values $c_{ijk}$ in the energy functional E correspond roughly to the spring lengths $L_i$ in $E_{spring}$. In this way, data values can be thought of as spring or edge lengths in data networks or graphs.

The intuitive effect, then, of minimizing E is to allow the simultaneous relaxation of multiple (frustrated) data graphs. Embodiments of the present invention greatly expand and improve upon the applicability and implementation of data graph relaxation. In particular, embodiments of the present invention can include a modified form of the energy functional E that extends applicability to more general data sets and analyses. Embodiments of the present invention also generalize multiple graph relaxation to admissible geometrization with respect to non-quadratic, non-least squares objective functions.

Although picturesque, the above analogy with idealized spring networks does not explain how arbitrary data sets are made geometric, tensile or rigidified. Embodiments of the present invention geometricize or rigidify data through (iterative) admissible geometrization. Admissible geometrization of data is broader than energy minimization and includes techniques and objective functions qualitatively different from E. In addition, admissible geometrization relates to a 2-phase process for explicit model construction for derived measurement or conversion of intermixed quantitative/qualitative data. In the following discussion, use of the single word "geometrization" shall include reference to the longer phrase "admissible geometrization."

Geometrization begins by encoding data elements as the edge weights or "lengths" of certain complete graphs $\Gamma_k$ (k running over some finite index set). These complete graphs are potentially "flabby" (or "rigid") depending on their mutual relationships and the strength of their scale types. Data sets are partitioned twice for admissible geometrization; the first partition is used to construct the graphs $\Gamma_k$, the second encodes the scale type of sets of $\Gamma_k$ edge lengths. Unlike USPA-1 and USPA-2, embodiments under the present invention provide a meaningful tool for analyzing doubly partitioned data and intermixed scale types in the graphs $\Gamma_k$ (admissibility, scale type, meaningfulness, and other measurement theoretic ideas are discussed in more detail below). This not only allows an embodiment under the present invention to be used for general scale conversion, data synthesis, and MCDM, but it also expands and improves on the disclosures in USPA-1 and USPA-2 for general pattern recognition, classification, and data analysis.

To make precise the idea of admissible geometrization, some concepts from the representational theory of measurement (RTM) can be referenced. An informal discussion of RTM is sufficient for the present discussion. The following discussion follows Narens (Narens, L., *Theories of Meaningfulness*. Lawrence Erlbaum, Mahwah, N.J., 2002).

Since Stevens, it is generally understood that data measurements can be differentiated into various qualitative and quantitative classes or scale types. (Stevens, S. S., "On the theory of scales of measurement," *Science*, 103, 1946, pp. 677-680.)

Let A be a set (A is generally some empirical system of interest). Then a measurement or representation of A is a function $f$ from A into a subset $R \subseteq \mathbb{R}$ of the real numbers $$f: A \to R \subseteq \mathbb{R}.$$

The set of all representations for a given set A, denoted by S=Hom(A, R), is called a scale (the notation Hom( ) derives from the formal representational theory of measurement where the measurements $f$ are homomorphisms of relational structures). The image of a scale S is the set Im S={$f(x)$ $\in$A|x$\in$A and $f\in$S}. Let G be a transformation group on ImS, that is, G is a group of functions from ImS to itself with group operation the composition of functions. Then we say that S has scale type G, or G is the scale group of S, if there exists a fixed $f\in$S such that $$S = G_f = \{g \circ f | g \in G\},$$

that is, S is the (induced) G-orbit of $f$. Here the scale S is assumed to be regular and can be safely ignored in the following discussion. The elements of the scale group G are called admissible transformations. In common use are nominal, ordinal, interval, ratio, and absolute scale types corresponding to permutation, isotonic, affine, similarity, and trivial admissible transformation groups, respectively.

Note that the above groups of admissible transformations satisfy a chain of inclusions. These inclusions provide an order on scale types with the weakest scale type or measurement level (nominal) corresponding to the largest group of admissible transformations (permutations) and the strongest scale type (absolute) associated to the smallest (trivial) group of admissible transformations.

We turn now to the RTM concept of meaningfulness. The basic idea behind meaningfulness is that the scale type of a set of measurements puts limitations on the conclusions that can be drawn from those measurements. A statement involving scales of measurement is said to be meaningful if its truth value is unchanged whenever every scale in the statement is modified by an admissible transformation. (See Roberts, F. S., "Limitations on conclusions using scales of measurement," in S. M. Pollock et al., Eds., *Handbooks in OR & MS*, Vol. 6, Elsevier, N.Y., 1994.) An example of a meaningless statement is the following: "Since it is 40° F. today, it is twice as hot as yesterday when it was only 20° F." This statement is meaningless because if we modify the scales in the statement using the admissible affine transformation C=(5/9)(F−32) then the statement is false in terms of degrees Celsius.

An embodiment under the present invention can relate, in part, to meaningful aggregation. Consider the problem of aggregating ordinal preference ratings P=(3, 3, 3) and Q=(1, 1, 4). If we compute the usual arithmetic mean on these two sets of ratings, we find the mean of P is greater than the mean of Q. Since we assumed the preference ratings were measured on ordinal scales, the above statement about the relative order of the means of P and Q should remain true when the ratings are modified by a monotone transformation. If we apply the (admissible) monotone transformation: 1→3, 3→4, 4→7 and compute the mean on the transformed data, we discover that the mean of P is now less than the mean of Q. Thus the truth value of the statement concerning means of ordinal data is not preserved and we conclude that the mean is not a meaningful merging function for ordinal scales.

It turns out that the only meaningful merging function for ordinal data are order statistics (see Ovchinnikov, S., "Means of ordered sets," *Math. Social Sci.*, 32, 1996, pp. 39-56). Order statistics are also the only meaningful merging functions for mixed qualitative and quantitative data since, for closed-form aggregation processes, the scale type of intermixed scales are determined by the scale type of the weakest scale (Osborne, D. K., "Further extensions of a theorem of dimensional analysis," *J. Math. Psychol.*, 7, 1970, pp. 236-242.)

Real world data tends to be a mixture of different scale types. This is particularly true in the social and non-physical sciences, including economics, econometrics, finance, psychology, and so forth. Commonly used averaging or merging functions such as the arithmetic and geometric means are meaningless for intermixed data that includes nominal or ordinal scale types. Similarly, standard techniques for MCDM, for example, the analytical hierarchy process (AHP) (see Saaty, T. L., *The Analytical Hierarchy Process: Planning, Priority Setting and Resource Allocation*, RWS Publications, Pittsburgh, 1990.), are meaningless on mixed scale data. Embodiments of the present invention as disclosed herein provide an iterative approach to meaningful derived measurement or scale conversion, merging, and MCDM on data from qualitative, quantitative, and intermixed qualitative/quantitative scales.

Embodiments of the present invention offer a further improved method and apparatus for classification, pattern recognition, sensor fusion, data compression, network reconstruction, signal processing, derived measurement or scale conversion, aggregation of intermixed scale type data, and multiple criteria decision making.

The method and apparatus in accordance with embodiments of the present invention provide an analysis tool with many applications. This tool can be used for pattern classification, pattern recognition, signal processing, sensor fusion, data compression, network reconstruction, measurement, scale conversion or scaling, data synthesis or merging, indexing, or scoring, multiple criteria decision making, and many other purposes. Embodiments of the present invention relate to a general method for data analysis based on admissible geometrization. Embodiments of the present invention can use admissible geometrization (geometrization) to analyze data. A number of methods for geometrization of data have been identified. One embodiment of the invention utilizes a modified form of individual differences multidimensional scaling (2p-IDMDS) with generalized constraints. This embodiment also explicitly utilizes the 2-phase structure of 2p-IDMDS.

Let $C=\{C_1, \ldots, C_m\}$ be a data set with data objects or cases $C_k = \{c_{k1}, \ldots, c_{kn}\}$ and let $$C = \overset{r}{\underset{l=1}{P}} C_l, \tag{1}$$

be a (second) partition of C. (In the following, the letter l, written as a subscript, will indicate partition classes $C_l$ of partition (1). The subscript letter k will indicate data objects $C_k$. We will from now on also refer to this second partition of C as partition (1) or the (1)-partition.) The classes $C_l$ are determined by the user and need not be identical to the data objects $C_k$. It is assumed that each class $C_l$ of partition (1) has a definite scale type with scale group $G_l$ of admissible transformations.

Embodiments of the present invention can admissibly geometrize the data C. This is accomplished by first associating to each data object $C_k$ a weighted complete graph $\Gamma_k$. The weights or edge "lengths" of $\Gamma_k$ are given by the $c_{ki} \in C_k$ and are determined up to admissible transformation by partition (1). More specifically, each edge length $c_{ki}$ belongs to some class $C_l$ and hence has scale type $G_l$. Intuitively, we think of the graphs $\Gamma_k$ as implicitly or potentially geometric objects with varying degrees of flabbiness (or rigidity) depending on the scale types of their edge lengths as determined by partition (1). By making this geometry explicit, embodiments of the present invention can discover structure and relationships in the data set C. In traditional IDMDS, the data elements $c_{ijk}$ are, in fact, proximities (similarities or dissimilarities). In this case, the potential geometry of the graphs $\Gamma_k$ is closer to the surface. Embodiments of the present invention do not require that $c_{ijk}$ be proximity data. In this sense, embodiments of the present invention disclose a new admissible length based encoding of information, which greatly extends the length based encoding disclosed in USPA-1 and USPA-2.

There are number of ways to actualize or make explicitly geometric the potential geometry of the graphs $\Gamma_k$. One embodiment of the invention utilizes a significantly modified form of IDMDS, called 2p-IDMDS for 2-partition or 2-phase IDMDS, to admissibly geometrize the $\Gamma_k$. 2p-IDMDS is based on minimization of the following modified energy functional $$E_p(g_1, \ldots, g_m, X_1, \ldots, X_m) = \sum_{k=1}^{m} \sum_{i<j} w_{ijk}(\tilde{g}_k(c_{ijk}) - d_{ij}(X_k))^2, \tag{2}$$

subject to the linear constraints $$X_k = ZA_k. \tag{3}$$

Z and $X_k$ are configurations of points in real Euclidean space $R^N = \langle R^N, d \rangle$, with the usual metric $d=d_{ij}$, and the $A_k$ are N×N matrices with possible restrictions. The functions $\tilde{g}_k$ are certain (1)-partition specific mappings defined in terms of admissible transformations $g_l \in G_l$ from the scale group associated to the (1)-partition class $C_l$. (A definition of the $\tilde{g}_k$ is given below.)

Minimization of $E_p$ with respect to the transformations $g_l$ insures that the scale types of the (1)-partition classes $C_l$ are preserved. In this way, minimization of (2) defines an admissible or meaningful geometric representation $$\Gamma_k \to X_k \to R^N$$

of data graphs $\Gamma_k$ by configurations of points $X_k$ in $R^N$.

The constraint equations (3) imply that the embodiment of the invention is a merging process. Each complete graph $\Gamma_k$, or embedded configuration $X_k$, is iteratively merged, and thereby deformed, into the reference configuration Z. This embedding, merging, and deformation respects the scale types of the $\Gamma_k$ edge lengths through the admissible transformations $g_l$. Differences in deformation between the individual configurations $X_k$ (graphs $\Gamma_k$) and the reference configuration Z are encoded in the matrices $A_k$. For diagonal $A_k$, the components of the vector $\text{diag}(A_k)$ of diagonal elements of $A_k$ are dilations along the coordinate axes of $R^N$. Under appropriate identification conditions, the set of dilation vectors $\text{diag}(A)=\{\text{diag}(A_k)\}$, and more generally, the set of deformation matrices $A=\{A_k\}$, can define classification spaces for the data objects $C_k$.

In addition, norms $\|\text{diag}(A_k)\|$ on the space $\text{diag}(A)$ can be interpreted as giving the (Z-relative) overall sizes of the configurations $X_k$ and hence of the graphs $\Gamma_k$. We can interpret the overall size of $X_k$ (via $A_k$) as the merged value of the data object $C_k$. Since vector norms are ratio scale numbers, the process has produced ratio scale merged values from the possibly intermixed qualitative/quantitative scales $C_l$. We will see that $\text{diag}(A_k)$ is generally a complex, that is, a list of independent ratio scaled values, unless an identification condition is enforced on the matrices $A_k$. In this more general case, the vector norm or magnitude $\|\cdot\|$ is not a meaningful (merging) function and we aggregate the elements of diag $(A_k)$ using other synthesizing functions including the determinant $\det(A_k)$ on the matrix $A_k$ and (weighted) geometric mean on the components of $\text{diag}(A_k)$. Weights for weighted aggregation can be introduced externally or integrated into the geometrization procedure itself as discussed in more detail hereafter.

Through admissible geometrization, embodiments of the present invention can also provide explicit (derived) measurement or scale conversion models from the scale types $G_l$ of $C_l$ to interval or ratio scales. Geometrization via minimization of $E_p$ contains an iterative alternating or 2-phase process whereby updated Euclidean distances $d_{ij}(X_k)$ are fitted to data values $c_{ijk}$, or transformed values $g_l(c_{ijk})$ and then updated transformed values are regressed on updated distances. Transformed values are also called pseudo-distances or disparities in the IDMDS literature. See Borg, I. and Groenen, P., *Modern Multidimensional Scaling: Theory and Applications*, Springer, N.Y., 1997. After some convergence criterion has been reached, the resulting transformed values can be converted to at least (independent) interval scales. Often ratio scales can be produced. If desired, the resulting output scales are made commensurate. Further mathematical or multivariate statistical manipulation of the transformed data is now possible including quantitatively meaningful aggregation using standard statistical merging functions and the application of exact statistics and distance function multiresponse permutation techniques.

Embodiments of the present invention also make use of the above 2-phase process for MCDM and prioritization of alternatives measured with respect to qualitative/quantitative and intermixed scale types. Further details of these applications are given below.

One embodiment of the invention implements admissible geometrization through 2p-IDMDS. It is based on a 2-partition or entry conditional extension of PROXSCAL, a constrained majorization algorithm for traditional IDMDS. (See Commandeur, J. and Heiser, W., "Mathematical derivations in the proximity scaling (Proxscal) of symmetric data matrices," *Tech. Report No.* 99-93-03, Department of Data Theory, Leiden University, Leiden, The Netherlands.) Embodiments of the present invention may be implemented using 2-partition or entry conditional extensions of other IDMDS algorithms. In the following, $\text{tr}(A)$ and $A^t$ denote, respectively, the trace and transpose of the matrix A.

Let $C=\{C_1, \ldots, C_m\}$ be a data set with data objects or cases $C_k=\{c_{k1}, \ldots, c_{kn}\}$ and let $G_l$ be scale groups for classes $C_l$ from partition (1). The 2p-IDMDS algorithm has eight steps with steps 4 and 6 implementing the 2-phase process described above.

1. Choose constrained initial configurations $X_k^0$.
2. Find transformations $g_l(c_{ijl})$ for fixed distances $d_{ij}(X_l^0)$.
3. Compute the initial energy $$E_p(g_1, \ldots, g_m, X_1^0, \ldots, X_m^0) = \sum_{k=1}^{m} \sum_{i<j} w_{ijk}(\tilde{g}_k(c_{ijk}) - d_{ij}(X_k^0))^2,$$

4. Compute unconstrained updates $\overline{X}_k$ of $X_k^0$ using transformed proximities $\tilde{g}_k(c_{ijk})$ via majorization.
5. Solve a metric projection problem by finding $X_k^+$ minimizing $$h(X_1, \ldots, X_m) = \Sigma \text{tr}(X_k - \overline{X}_k)^t V_k (X_k - \overline{X}_k)$$

subject to the constraints $X_k = Z A_k$. ($V_k$ are positive semidefinite matrices constructed from the weights $w_{ijk}$.)
6. Replace $X_k^0$ by $X_k^+$ and find transformations $g_l(c_{ijl})$ for fixed distances $d_{ij}(X_l^0)$.
7. Compute $E_p$.
8. Go to step 4 if the difference between the current and previous values of $E_p$ is greater than $\epsilon$, some previously defined number. Stop otherwise.

In steps 3 and 4, the transformations $\tilde{g}_k$ are defined in terms of admissible transformations $g_l \in G_l$ as follows $$\tilde{g}_k(c_{ijk}) = g_l(c_{ijk}) \text{ for } c_{ijk} \in C_k \cap C_l.$$

In (optional) step 2, and in step 6, the admissible transformations $g_l$ are elements of the partition (1) scale groups $G_l$ and the notation $d_{ij}(X_l^0)$ means those Euclidean distances corresponding to the admissibly transformed data elements $g_l(c_{ijl})$. Various normalizations or standardizations can be imposed on the transformed values $g_l(C_l)$ or on sets of transformed values. (Note, g(B) denotes the image of the set B under the mapping g.) For example, the union of the transformed values $g_l(C_l)$ can be normalized (or made commensurate) in each iteration, or the transformed values $g_l(C_l)$ can be separately normalized in each iteration and then the union normalized after convergence. The specific method of normalization may depend on the data and on the purpose of the analysis. In traditional IDMDS, normalization (standardization) is used to avoid the degenerate trivial solution $X_k = 0$ and $\tilde{g}_k(C_k) = 0$ where configurations and associated pseudo-distances are both mapped to zero. In the more general setting of 2p-IDMDS, normalization can have other purposes including commensuration across combinations of partition classes $C_l$.

If partition (1) is trivial, that is, if there is the only the one class $C_j=C$, then the above 2p-IDMDS algorithm corresponds to standard unconditional IDMDS although extended to non-proximity data. If the partition classes $C_l$ of (1) are just the data objects $C_k$, and the scale groups $G_l$ are the same for all l (k), then the 2p-IDMDS algorithm corresponds to standard matrix conditional IDMDS (again, extended to non-proximity data). Otherwise, 2p-IDMDS is a novel, generalized form of IDMDS.

The PROXSCAL initialization step 1 is performed under the identity assumption $$X_1^0 = X_2^0 = \ldots X_m^0.$$

For certain applications of embodiments of the present invention, this identity assumption may be inappropriate. In such cases, step 2 can be skipped or the initial configuration can be generated separately from the input data and made to satisfy the constraint equation $X_k = ZA_k$ through an initial metric projection.

The solution of the metric projection problem in step 5, is subject to the constraint equations $X_k = ZA_k$. There is an indeterminacy in these equations: If Q is an arbitrary nonsingular matrix, then $$X_k = ZA_k = ZQQ^{-1}A_k = \overline{Z}\overline{A}_k,$$

so $\overline{Z}\overline{A}_k$ is another solution to the constraints. To insure the uniqueness of the solutions to the constraint equation an identification condition can be imposed on the matrices $A_k$. One such condition is expressed by the formula $$\sum_{k=1}^{m} A_k A_k^t = mI_N, \quad (4)$$

where $I_N$ is the N-dimensional identity matrix. (It is also possible to impose an identity condition on the reference configuration Z.) Imposition of an identification condition such as (4) has a number of benefits besides removing the ambiguity in the constraint specification. In particular, an identification condition allows the set of matrices $A=\{A_k\}$ to be treated as part of a matrix classification space and for diagonal $A_k$, the set $\text{diag}(A)=\{\text{diag}(A_k)\}$ define vectors in an N-dimensional classification vector space. The utility of enforcing an identification condition will be elaborated on further below.

The 2-phase part of the 2p-IDMDS algorithm is encoded in the initial (optional) step 2 and then through iteration over steps 4 and 6 until the convergence criteria in step 8 is met. We note that in PROXSCAL, the ratio model is fixed in step 2 once and for all. For the purposes of scale conversion, embodiments of the present invention allow for the update of the ratio model with each iteration of the 2p-IDMDS algorithm. It may also be useful to define new admissible transformation algorithms for step 6. For instance, (weighted) monotone regression as implemented in PROXSCAL is based on means of blocks of order violators; certain applications of embodiments of the present invention may be enhanced by introducing monotone regression with medians on blocks of order violators.

Step 6 of traditional IDMDS algorithms is called optimal scaling. For ordinal optimal scaling, IDMDS algorithms generally distinguish between discrete and continuous data. If the data is continuous, then optimal scaling uses the so-called primary approach to ties where ties in the original data are allowed to be broken in the transformed data. In the secondary approach to ties, ties are not allowed to be broken and this is intended to reflect the discrete nature of the data. In the remainder of this disclosure, we will assume that the secondary approach to ties is used in step 6, that is, in the 2-phase portion of 2p-IDMDS. This makes it straightforward to construct derived measurement models from 2p-IDMDS transformed data. Derived measurement models may also be constructed using the primary approach to ties, but additional merging (of untied pseudo-distances) may be used to define a single-valued model. In general, the selection of primary or secondary ties depends on the data and purposes of the analysis.

2p-IDMDS, through the PROXSCAL algorithm, also allows direct constraints on the reference configuration Z. This can include the ability to fix some or all of the points in Z. Borrowing from the spring network analogy, fixing coordinates in Z is analogous to pinning some or all of the spring/data network(s) to a rigid frame or substrate.

Figure 1:
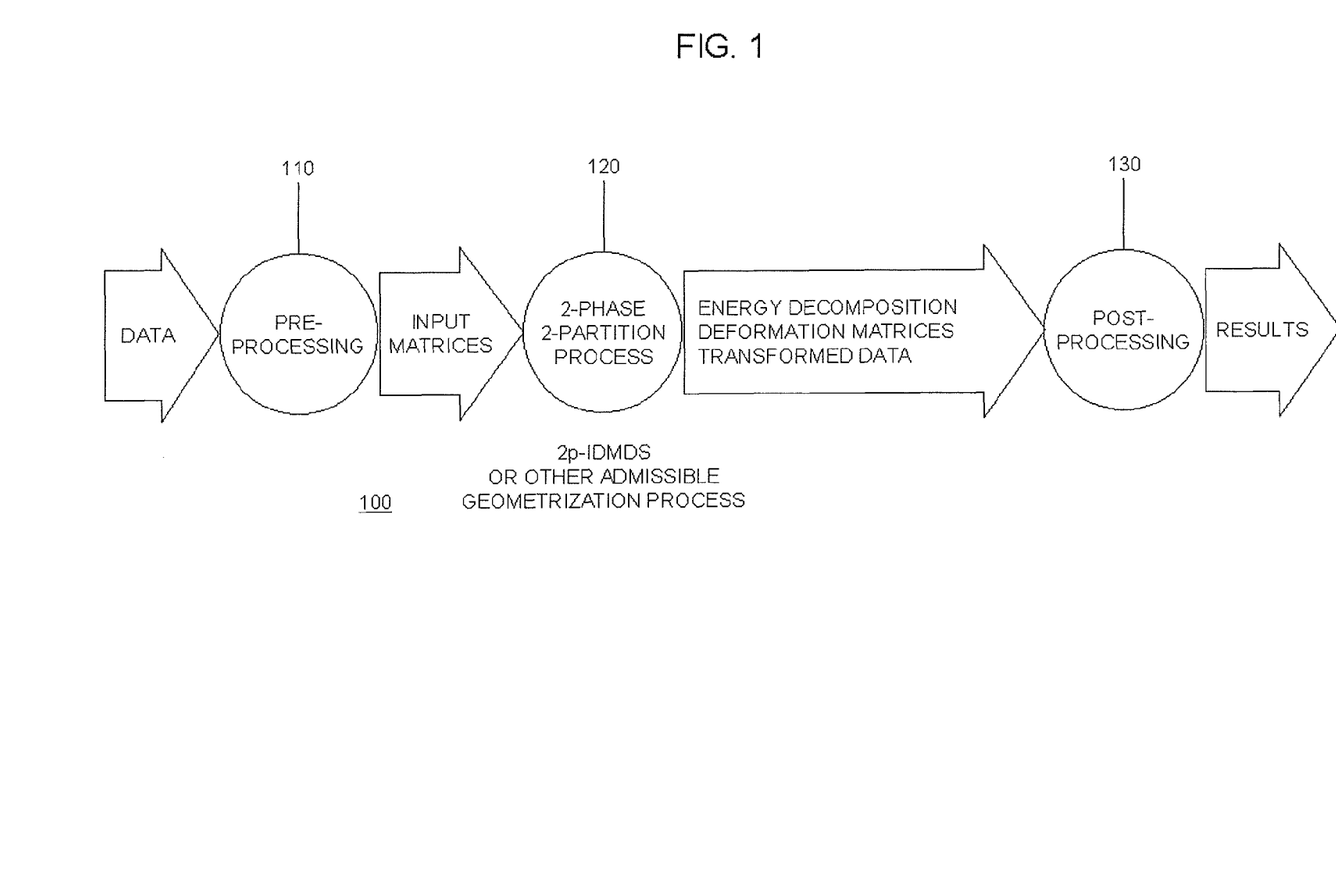
FIG. 1 is a diagram illustrating components of an analyzer according to an embodiment of the invention.

FIG. 1 illustrates an operational block diagram of a data analysis/classifier/synthesis/measurement/prioritizing tool 100. Tool 100 is a three-step process. Step 110 is a front end for data preprocessing and transformation. Step 120 is a process step implementing admissible geometrization—in the presently illustrated embodiment, this process step is implemented through the 2p-IDMDS algorithm described above. Step 130 is a back end or postprocessing step which organizes, interprets, and decodes the output of process step 120. These three steps are illustrated in FIG. 1.

It is to be understood that the steps forming the tool 100 may be implemented in a computer usable medium or in a computer system as computer executable software code. In such an embodiment, step 110 may be configured as a code, step 120 may be configured as second code, and step 130 may be configured as third code, with each code comprising a plurality of machine readable steps or operations for performing the specified operations. While step 110, step 120, and step 130 have been shown as three separate elements, their functionality can be combined and/or distributed. It is to be further understood that "medium" is intended to broadly include any suitable medium, including analog or digital, hardware or software, now in use or developed in the future.

Step 110 of the tool 100 consists of the transformation of the data into matrix form and the encoding of partition (1). The matrix transformations for the illustrated embodiment can produce nonnegative matrices. The type of transformation used depends on the data to be processed and the goal of the analysis. (Note, step 110 input data may include modified energy weights $w_{ijk}$, see equation (2), which can also be written in matrix form. Examples of such weight matrix encodings follow.) Similarly, the form of the encoding of partition (1) can be determined by the data to be processed, its scale type(s), and the goal of the analysis. While the data processed in step 110 may be proximity data, it is a goal of step 110 to represent arbitrary forms of data as lengths or proximities. This can be accomplished by simply writing the data into some part of one or more symmetric or lower triangular matrices (symmetric matrices can be assembled from lower triangular matrices). For example, sequential data, such as time series, signal processing data, or any data which can be written as a list, can be transformed into symmetric matrices by direct substitution into the lower (upper) triangle entries of a matrix of sufficient dimensionality. Matrices constructed in this manner define complete weighted graphs (possibly with missing weights) where the weights or edge lengths are the raw data values. In conjunction with the scale type information in partition (1), these matrices are interpreted as having potential (admissible) geometry which is actualized or explicitly geometricized by the illustrated embodiment of the invention through 2p-IDMDS in step 120.

Figure 2:
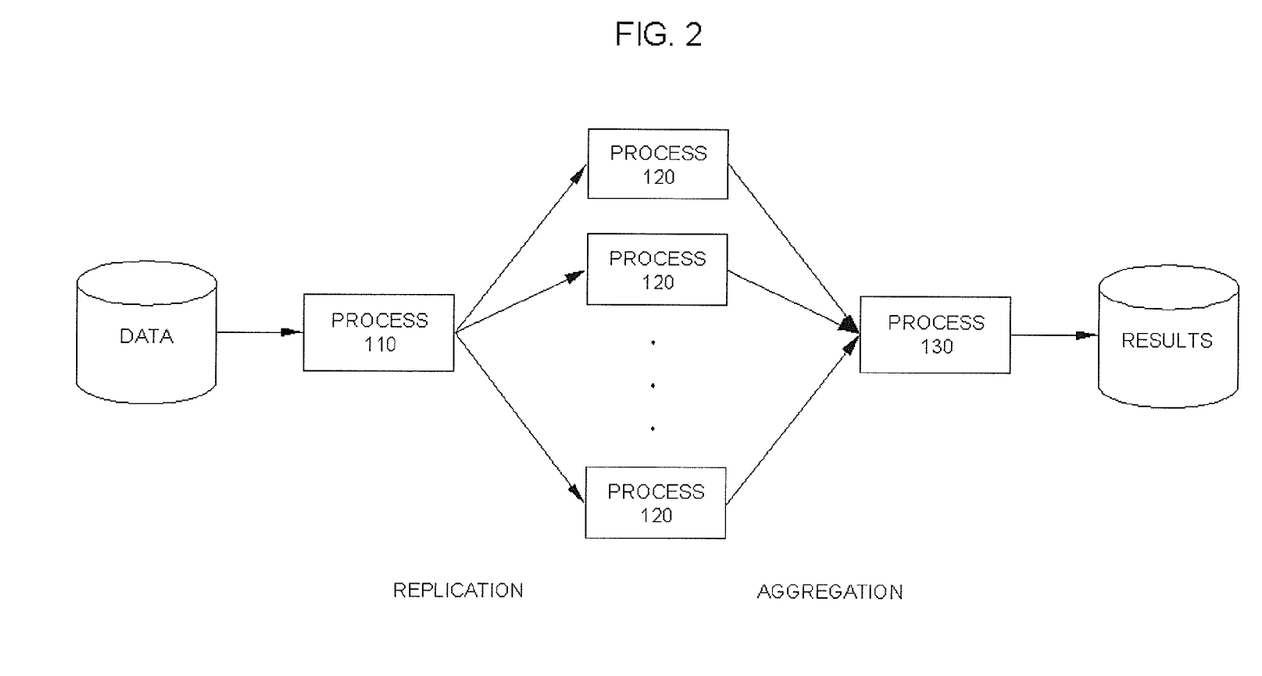
FIG. 2 is a diagram relating to the use of resampling or replication and aggregation with the analyzer according to the embodiment of FIG. 1.

Permutation of direct matrix substitution order may result in different admissible geometries. Invariance of tool 100 analyses under rearrangements of substitution order can be restored by averaging tool 100 (step 120) over all inequivalent geometries. Approximate invariance of tool 100 analyses is achieved by averaging tool 100 (step 120) over a sample or subset of inequivalent geometries. This averaging over permutations of substitution orders or geometries is illustrated in FIGS. 2 and 3. Averaging can be used as well in tool 100 for smoothing metastable configurations $X_k$ and matrices $A_k$ associated with local minima of the energy functional $E_p$ and to insure invariance over embedding dimension N. Note, averaging here includes a merging technique that is meaningful and appropriate for the given data set. This general technique of synthesizing over multiple versions of the same input is referred to here as resampling or replication. (This terminology should not be confused with the statistical method of resampling, though the ideas are similar.) These and related matters are discussed in more detail below.

Step 120 of tool 100 reifies or makes explicit the potential geometry of the matrices $M_k$ from step 110. In illustrated embodiment of the invention, Step 120 admissibly geometricizes data via 2p-IDMDS. 2p-IDMDS is based on minimization of the modified energy functional $E_p$ over geometric configurations $X_k$ of step 110 matrices $M_k$ and partition (1) specified admissible transformations. $E_r$-minimal geometric representations or configurations satisfy the general constraint equations $X_k = Z A_k$ where the $A_k$ can be identity, diagonal, reduced rank, or nonsingular matrices.

Step 130 of the tool 100 consists of visual and analytical methods for organizing, presenting, decoding, interpreting, and other postprocessing of output from step 120. The output of 2p-IDMDS includes, but is not limited to, decomposition of energy $E_p$, transformed data $g_l(C_l)$ for l running over partition classes, and deformation matrices $A_k$. (Note, g(B) denotes the image of B under the mapping g.) 2p-IDMDS may produce high dimensional output benefiting from analytical postprocessing techniques. Some examples of analytical techniques are the following: clustering methods, statistical tools and permutation procedures, vector space metrics such as norm, trace, and determinant functions, projection pursuit, and Gaussian and other boundary growing techniques. There are many others. In addition, differential coloring of dilation vectors diag($A_k$) provides a visual and analytic tool for interpretation and decoding of step 120 output including detection of outliers and anomalous signals and behaviors. Elements of geometric fit, which for the presently illustrated embodiment of the invention include energy decompositions and functions of energy decompositions, can be utilized for pattern matching and agreement, scoring and ordering, and other data/pattern analyses. Graphs of total modified energy $E_p$ against optimal embedding dimensionality provide measures of network and dynamical system dimensionality. Step 130 of tool 100 also provides methods for organization and commensuration of optimally transformed data values. Organized and commensurate transformed data can be used to define a fixed scale conversion model for non-iterative derived scaling of new data, that is, without repeating steps 110 and 120 of tool 100. Optimally transformed data values $g_l(C_l)$ can also be used to determine MCDM priorities. These and other applications of tool 100 will be described in detail below.

Let $C = \{C_1, \ldots, C_m\}$ be a data set with data objects or cases $C_k = \{C_{k1}, \ldots, C_{kn}\}$. Step 110 of tool 100 transforms each $C_k \in C$ to matrix form $M(C_k) = M_k$ where $M_k$ is a p-dimensional nonnegative hollow symmetric matrix. (Hollow means diag ($M_k$)=0, the p-dimensional zero vector.) The cases $C_k$ can be written to arbitrary p×q matrices $M_k$ (in an alternative embodiment discussed later, the matrices $M_k$ are rectangular), however, for clarity of exposition, the above restrictions are adopted.

More formally, step 110 may be expressed as a map or transformation)

$$M: C \rightarrow H^p(R^{\geq 0})$$

$$C_k \rightarrow M_k$$

where $H^p(R^{\geq 0})$ denotes the set of p-dimensional, nonnegative, hollow, symmetric matrices. The precise rule(s) for calculating M, including determination of matrix dimensionality p, depends on the data C and the purpose of the analysis.

Since the $M_k$ are nonnegative hollow symmetric matrices, they can be interpreted and processed in tool 100 as proximity matrices. In this way, the transformation $$C_k \rightarrow M_k$$

can be thought of as defining a mapping $$C_k \rightarrow \Gamma_k$$

from cases $C_k$ to weighted complete graphs $\Gamma_k$ with p vertices or nodes.

If C contains proximity data, or if proximity data is constructed from C prior to or as part of the transformation M, then the matrices $M_k$ are bonafide proximity matrices. For example, if C consists of binary images $C_k$, then $M_k$ may be defined as the distance matrix with ij-th entry the two dimensional city-block distance between "on" pixels i and j. However, C need not satisfy either of these conditions to be processed by tool 100.

The map M can be combined with other transformations F to form composite matrix encodings $(M \circ F)(C_k)$. For instance, F could represent the fast Fourier transform on signal $C_k$ and $M_k = [M_{ij}]_k$ is defined by $m_{ijk} = |a_{ki} - a_{kj}|$ with $a_{ki} = F(c_{ki})$ the output magnitudes for signal $C_k$ at frequencies i and j. The case where F represents a (geometry altering) permutation of the elements of $C_k$ is important for scale conversion and synthesis based on direct substitution matrices $M_k$ and is discussed further below. If the data C are organized in tabular form, that is, as a rectangular matrix with rows $C_k$, then a useful transformation is $F(C) = C^t$ the transpose of C. In the context of data mining, this transformation amounts to applying tool 100 to data variables or fields instead of data cases or individuals.

If C is not comprised of proximity data, we can still treat it as proximity data through direct substitution of data elements $c_{ki} \in C_k$ into entries of $M_k$. The map M as direct or entry substitution is one approach to preprocessing intermixed measurement level data for tool 100 based scale conversion, data merging, and MCDM, as well as, general pattern recognition, classification, and data analysis.

For direct substitution of data into matrices $M_k$ it is sufficient to consider only the lower triangular portion of $M_k$ (the upper triangle is determined by symmetry). Let $T_k = [t_{ij}]_k$ be a lower triangular matrix (or the lower triangle of $M_k$) and define v=max(#$C_k$), the maximum cardinality, #$C_k$, over data sets $C_k \in C$. Then for direct substitution, the matrices $T_k$ have order $V = \lceil (1+\sqrt{1+8v})/2 \rceil$ where $\lceil x \rceil$ denotes the ceiling function. V is the smallest positive integer satisfying the inequality $V(V-1)/2 \geq v$.

The entries in $T_k$ are filled in, from upper left to lower right, column by column, by reading in the data values of $C_k$ which are assumed to be ordered in some consistent manner. For example, for data object $C_k$ and triangular matrix $T_k$: $t_{21k}=C_{k1}$ (the first data value in $C_k$ is written in the second row, first column of $T_k$), $t_{31k}=C_{k2}$ (the second data value of $C_k$ is written in the third row, first column of $T_k$), $t_{32k}=C_{k3}$, $t_{41k}=C_{k4}$, and so forth. Note, we assume $T_k$ is hollow, so we set $t_{iik}=0$ for all $i \leq v$.

If the number of data values n in some data set $C_k$ is less than v, or if strict inequality, $V(V-1)/2>v$, holds, then the remaining unfilled entries in $T_k$ can either be left missing or they can be filled in with dummy or augmenting values. (If the entries are left missing, we will refer to this as augmenting with missing values). Various ways of augmenting matrices $M_k$ are described in more detail below. Embodiments of the present invention allow partitioning and isolation of these augmenting values from actual data values during step 120 processing. Note, too, that missing values allow tool 100 to be applied to data sets C with data objects $C_k$ having different numbers of elements; this is the case for both non-proximity and proximity data.

As mentioned earlier, if direct substitution matrix encoding is utilized in step 110 of tool 100, then any consistently applied permutation of the ordered elements in the $C_k$ will result in a new input matrix $T_k$ with possibly different admissible geometry. (We note that the number of geometry altering permutations is less than the total number of possible permutations on the entries of $C_k$, but this number still grows very rapidly with v.) FIG. 2 shows the use of tool 100 for resampled or replicated input. Tool 100 may be applied according to FIG. 2 to replications over permutations on direct substitution order, to replications over some or all 2p-IDMDS embedding dimensions, to replications from multiple 2p-IDMDS random starts, to some combination of the above, or to replications or samplings with respect to other 2p-IDMDS inputs or parameters of interest.

In the case of direct substitution matrix encodings, a permutation invariant output from tool 100 can be defined by averaging step 120 output, including $E_p$ decompositions, configurations $X_k$ and Z, and matrices $A_k$, over all geometry altering rearrangements on the $C_k$. A completely permutation invariant output is computationally intractable for even moderately sized data sets. Still, approximately invariant output can be found by averaging over a sample of all possible permutations. The appropriate sample size may be determined statistically through stability or reliability analysis of replication output. The averaging process or function used to synthesize sample (resampled) or replicated output of step 120 of tool 100 depends on the input data and purpose of the analysis.

For specificity, we give some examples of this averaging process; other tool 100 replication and averaging procedures may be easily created by those skilled in the art. We assume that tool 100 has been implemented using r samples or replications. Suppose first that these replications are over step 110 direct substitution orders, then the r replicated deformation matrices $A_{ki}$, where the subscript i denotes the ith sample or replication number, can be merged by computing separate geometric means on the r replication values for each entry of the matrices $A_{ki}$. In a second example, we suppose that the $A_{kl}$ are diagonal matrices and the goal of the tool 100 analysis is to synthesize the information in data objects $C_k$. This can be accomplished by computing norms, $\|\text{diag}(A_{ki})\|$, for each data object k and replication i, and defining the geometric mean of these r norms on the kth object to be the merged value of the information in $C_k$. If we again suppose we wish to merge the data in objects $C_k$, we can also compute the centroid of each $A_{kl}$ and then calculate the geometric mean of the r centroids for each k. We note that these last two examples include some sort of identification condition on the deformation matrices $A_{ki}$. In general, the goal of the analysis and the data analyzed will determine the manner in which replication and aggregation are carried out. In particular, depending on the circumstances, it may be possible to perform a calculation of interest on the i-th replication space first and then combine results over r replications; for other analyses, the classification configurations may be combined first and then the desired calculation performed.

An alternative matrix form $M_k$ which is invariant with respect to consistent reorderings of the data objects $C_k$. is called ideal node encoding. It consists of writing the list $C_k$ to the first column of a $(v+1) \times (v+1)$ hollow matrix after skipping the first row. It is called ideal node encoding because the resulting matrix can be interpreted as representing the proximity of n unspecified nodes or embedding points to an ideal node (in terms of complete graphs) or ideal point (in terms of configurations). The entries away from the first column and diagonal of the ideal node matrix can be left missing or filled in, as with direct substitution matrix encoding, using augmenting values. This ideal node matrix form is applicable to scale conversion, data merging, MCDM, and general data/pattern analysis.

Step 110 of the presently preferred embodiment of tool 100 also includes specification of partition (1) of C $$C = \overset{r}{\underset{l=1}{P}} C_l, \qquad (1)$$

along with the scale groups or scale types $G_l$ for partition classes $C_l$. The choice of partition (1) and scale groups $G_l$ are determined by the data C and specific analysis issues. The actual algorithmic encoding of partition (1) can be accomplished through indicator matrices or some other bookkeeping device and can be implemented readily by one skilled in the art. Inclusion of double or 2-partitioning in an embodiment of the invention allows tool 100 to be meaningfully extended to heterogeneous, messy, intermixed scale type databases common in real world applications. It also increases the flexibility of tool 100 in processing unusual or structured matrix forms $M_k$.

As an example of the latter, we describe briefly a step 110 hybrid matrix form that is assembled using direct substitution and derived proximities. Suppose that the data set C consists of both ordinal ratings data $C_k$ and certain proximity data $P_k$ defined as follows. Let $\text{rank}(c_{ki})$ denote the rank order of element $c_{ki}$ in the ratings data $C_k$. Define proximities $p_{ijk}=|\text{rank}(c_{ki})-\text{rank}(c_{kj})|$ for $1 \leq i \leq j \leq n$. Then the first column of the hybrid matrix $M_k=[m_{ij}]_k$ consists of the ratings $C_k$ as in the ideal node form, that is, beneath the zero diagonal the data list $C_k$ is substituted directly into the first column of $M_k$. The remaining entries of the hybrid matrix (including the diagonal) are filled in or augmented using the absolute rank differences $p_{ijk}$, $$[m_{(i+1)(j+1)}]_k = p_{ijk}.$$

To process this data meaningfully, we partition C into ratings $C_k$ and proximities $P_k$. with isotonic scale group for the ratings $C_k$ and similarity scale group for proximities $P_k$. (Other partitions might also be meaningful. For instance, the ratings $C_k$ (proximities $P_k$) could be collected into a single ordinal scale (ratio scale) class and/or the proximities $P_k$ could be assigned separately, or collectively, to a weaker scale type.)

Step 120 in tool 100 is the application of 2p-IDMDS as a 2-partition, 2-phase process for admissible geometrization. The matrices $M_k$ and partition related information are input to the modified PROXSCAL algorithm with additional user supplied settings and specifications including embedding dimension N, model or form of the constraint matrices $A_k$, initialization method and configuration, direct restrictions, if any, on the reference configuration Z, convergence criteria $\epsilon > 0$, and iteration limit. For certain applications, nontrivial weight matrices $W_k = [w_{ij}]_k$ are also specified. (We will say more about these settings and specifications in the examples below.)

The embedding dimension N for admissible geometrization step 120 depends on the input data C and the goal of the analysis. For scale conversion (merging) of intermixed scale type data, N is often set to the maximum possible value. For direct substitution matrices $M_k$, we set $N=V-1$. For ideal node matrix forms, $N=v+1$. Choosing large N may reduce the occurrence of artificially induced lossy compression of data. Large N also mitigates against convergence to non-global, local minima. Settings of embedding dimension N less than the maximum (the maximum being one less than the order of the matrices $M_k$) results in dimensional reduction of the data. Dimensional reduction is desirable under certain circumstances, for instance, if the data C is known to be (or suspected of being) highly correlated or redundant. However correlated or redundant information in C will also be automatically expressed in hyperplane or hypersurface restricted configurations $Z \subset R^N$ and in tool 100 output classification spaces $A = \{A_k\}$. (A purpose of postprocessing step 130 is to uncover such hypersurface arrangements.) Under certain conditions, an alternative to a fixed embedding dimension N is to sum or average step 120 output over all embedding dimensions N less than the maximum order of the input matrices $M_k$. This approach to embedding dimension via resampling can be used, in particular, when the output of interest are optimal transformations $g_l$, optimally transformed data values $g_l(C_l)$, and distances $d_{ij}(X_k)$. In this case, summation or averaging over outputs establishes the invariance of tool 100 with respect to dimensionality (modulo variations due to local minima and the failure of permutation invariance in case direct substitution transformations were used in step 110). Note that traditional IDMDS analyses seek low dimensional representations of proximity data. The preferred embodiment of tool 100 has no such requirement.

Step 130, the back end or postprocessing step of tool 100, organizes, decodes, interprets, refines, and generally further manipulates the 2p-IDMDS output of step 120. 2p-IDMDS output includes (but is not limited to) a reference configuration $Z \subset R^N$, deformation matrices $A = \{A_k\}$, various decompositions of the modified energy functional $E_p$, partition dependent optimal transformations $g_l$, optimally transformed data values $g_l(C_l)$, and distances $d_{ij}(X_k)$. When sampling or replication is used in step 110 and/or step 120 of tool 100, there may be multiple outputs to step 130, that is, multiple reference configurations Z, multiple sets of deformation matrices A, decompositions of $E_p$, multiple partition dependent optimal transformation $g_k$, and so forth.

The set of deformation matrices $A = \{A_k\}$ can be interpreted as a classification space that reveals structure and relationship between data objects $C_k \in C$. If the deformation matrices $A_k$ are diagonal, then the set of dimensional dilation values $\text{diag}(A) = \{\text{diag}(A_k)\}$ forms a set of complexes (where, again, a complex is a list of independent ratio scale values). Under the identification condition $$\sum_{k=1}^{m} A_k A_k^t = m I_N, \quad (4)$$

the set diag(A) is contained in an N-dimensional vector space and this space may be investigated using standard mathematical and statistical tools. The usefulness and generality of the sets A and diag(A) is greatly expanded under embodiments of the present invention as compared to traditional treatments in IDMDS and non-traditional applications in USPA-1 and USPA-2.

If preprocessing step 110 consists of direct substitution or ideal node matrices with partition (1), then deformation complexes diag(A) can be used to define a meaningful (iterative) merging process $$C_k \to \phi(\text{diag}(A_k)) \in R^{\geq 0}$$

that assigns a nonnegative ratio scale real number to each data object $C_k$. The function $\phi$ depends on the nature of the set diag(A) and whether or not an identification condition has been imposed on the dilation matrices $A_k$. If an identification condition such as (4) is used in step 120, then one possibility is $\phi(\text{diag}(A_k)) = \|\text{diag}(A_k)\|$, the usual $L^2$-noun on $R^N$ (or the nonnegative orthant in $R^N$). Other norms or functions could be used, as well. If no identification condition is specified, then the complexes diag($A_k$) can be merged using the (weighted) geometric mean $$\phi(\text{diag}(A_k)) = \phi(a_{k1}, \ldots, a_{kN}) = \left( \prod_{i=1}^{N} a_{ki}^{w_{ki}} \right)^{1/w_k},$$

where $w_{ki}$ are predetermined weights and $w_k$ their sum. An alternative to the geometric mean is the determinant $$\phi(A_k) = \det(A_k).$$

The determinant can be used to determine the size or volume of general deformation matrices $A_k$. The basic idea in each of the above examples is that the overall size of the deformation matrices $A_k$ can be interpreted as the merged value of the data object $C_k$. In this context, the identification condition (4) produces commensurated $A_k$ matrix entries. Because the measurement levels of the initial data have been preserved via (1)-partition admissible transformations, the above discussion discloses a meaningful scale conversion and merging process. The merged values are ratio scale magnitudes. In the case of direct substitution preprocessing, to insure that the above merging process is symmetric or permutation invariant it is necessary to average over all geometry altering rearrangements of the input data $C_k$. Since this is computationally intractable for even moderately sized data sets, a smaller sample of rearrangements or replications are averaged over resulting in an approximately symmetric merging process.

A set of metric or baseline merged values for data set C can be determined by applying step 120 of tool 100 to a trivial partition of C with ratio measurement level. Comparison of the original merged values of C with the baseline merged values is an indicator of the degree to which the data set C is amenable to standard statistical aggregation techniques. Original tool 100 merged values can also be compared directly to merged values from standard statistical aggregation functions such as the arithmetic or geometric mean. In addition, statistical measures of variation, scatter, or dispersion of tool 100 merged values may be used to determine the degree of coherence or relatedness of the underlying data set C.

For data/pattern matching, agreement, scoring, ordering, and other data/pattern analyses, (functions of) decompositions of the modified energy $E_p$ can be used. For example, if we let $E_{pk}$ denote the decomposition of $E_p$ with respect to data object k, $$E_{pk} = \sum_{i<j} w_{ijk}(\tilde{g}_k(c_{ijk}) - d_{ij}(X_k))^2,$$

then the ratio $$E_{pkl} = \frac{|E_{pk} - E_{pl}|}{E_p}$$

is a measure of agreement or matching between data objects k and l, where $E_p$ denotes the total energy. Another measure of agreement is given by the simple ratio $$\frac{E_{pk}}{E_{pl}}.$$

Step 130 of tool 100 can be configured to process decompositions of $E_p$ in many ways.

Let data objects $C_k$ be written to direct substitution or ideal node matrices $M_k$ with partition (1) classes $C_l$ and scale groups $G_l$. Step 130 postprocessing can be applied to step 120 2-phase transformed data values $g_l(C_l)$ to construct a fixed data conversion or derived measurement model. The 2-phase 2p-IDMDS transformed data values are substituted for the original raw values $c_{li}$ in partition classes $C_l$. The resulting substitution rule $$C_l \rightarrow g_l(C_l),$$

$$c_{li} \rightarrow g_l(c_{li}).$$

defines a derived measurement or scale conversion model. Nominal, ordinal, and ratio scale types are transformed into ratio scales. Interval (affine) scales are mapped to interval scales. In this way, the partition classes $C_l$ are converted to independent scales at interval measurement levels or stronger. After commensuration or normalization, statistical tools meaningful for interval scales can be applied to the converted data. In particular, the derived measurements can be meaningfully aggregated using the (weighted) arithmetic mean. Commensuration or normalization can also be applied on each iteration of the 2p-IDMDS algorithm in step 120 of tool 100. The choice of how and when to normalize transformed data depends on the data itself and the purpose of the tool 100 analysis.

If direct substitution matrix forms are used in step 110, then the above aggregation procedure can be made approximately symmetric (invariant) by averaging over a sample of geometry altering permutations of matrix entry substitution order. This replication or averaging over multiple applications of tool 100 is depicted in FIG. 2. To insure that averaging over samples is meaningful, the transformed values are first normalized or made commensurate across replications (this is possible since each partition class in each replication has been converted during step 120 to interval scale or stronger.) On the other hand, if ideal node matrix forms are used in step 110, then the above tool 100 scale conversion and merging procedure is symmetric (invariant) by construction (this follows since proximity matrices are invariant under simultaneous rearrangement of row and column orders).

Data that has been converted using tool 100 as disclosed above can be meaningfully analyzed or processed further using any statistical or mathematical technique. That is, the converted data sets, $g_l(C_l)$ are interval scale vectors, so are amenable to analysis by any statistical or mathematical method which is meaningful on interval scales.

A measure of the inconsistency of the derived measurements or transformed values $g_l(C_l)$ is given by the decomposition of the modified energy functional $E_p$ with respect to the partition class $C_l$. This is just the sum of squared residuals between transformed values and their associated configuration distances. To insure comparability, the decomposition can be divided by the number of elements in the class $C_l$. Scatter diagrams for each partition class $C_l$ of pseudo-distances and their associated distances against the initial partition data provide a graphical representation of the consistency of the derived measurement or scale conversion model. (These scatter diagrams are called Shepard diagrams in traditional IDMDS, here, however, we have extended the usefulness of these plots beyond the analysis of proximities.)

The tool 100 scale conversion and merging procedure disclosed above can be adapted to allow meaningful calculation of priorities for multiple criteria decision making (MCDM). The following discussion employs the terminology of the Analytic Hierarchy Process (AHP). (See Saaty, T. L., *The Analytical Hierarchy Process: Planning, Priority Setting and Resource Allocation*, RWS Publications, Pittsburgh, 1990.) However, embodiments of the present invention are applicable to MCDM independent of AHP or any other MCDM methodology.

Let $C = \{C_k\}$ be sets of pairwise comparisons of preferences between n alternatives with respect to m criteria. And let $D = \{d_1, \ldots d_m\}$ denote a set of m weights or priorities, one for each set of pairwise comparisons $C_k$. We define step 110 lower triangular matrices $T_k = [t_{ij}]_k = c_{ijk} \epsilon C_k$, where $c_{ijk}$ indicates the degree of preference for object i over object j with respect to criterion k. Often the $c_{ijk}$ are assumed to be ratios of weights, $c_{ijk} = w_{ik}/w_{jk}$, so that $c_{iik} = 1$. If this is the case, then an additional step is indicated whereby the diagonal elements $t_{iik}$ are set equal to zero, $t_{iik} = 0$. We also define constant weight matrices $W_k = [w_{ij}]_k$ where $w_{ijk} = d_k$ for all $1 \leq j \leq i \leq n$. C is also partitioned into classes $C_l$ with scale groups $G_l$. The matrices $T_k$, $W_k$, and scale groups $G_l$ are submitted to the 2p-IDMDS algorithm in step 120 of tool 100 for admissible geometrization. After appropriate step 130 commensuration and merging, that is, in accord with the characteristics of the partition classes $C_l$, the merged transformed values $g_l(C_l)$ form a nonnegative interval or stronger scale matrix (by substitution back into the original pairwise comparison matrices) from which priorities for the alternatives can be derived by computing the principle eigenvector of this matrix. See AHP reference above for this and other techniques for computing priorities. The point here is that embodiments of the invention can compute priorities on tool 100 converted (interval or better) scales.

If the data sets $C_k$ are composed of scores or ratings for each alternative, rather than pairwise preferences, then the $C_k$ may be written to ideal node matrices $M_k$ with missing value augmentation. Weight matrices $W_k$ are now constructed with first column entries below the diagonal equal to $d_k$ and remaining entries set equal to one. An appropriate (1)-partition of C is determined with classes $C_l$ and scale groups $G_l$. $M_k$, $W_k$, and $G_l$ are submitted to the 2p-IDMDS algorithm for admissible geometrization. The resulting transformed values $g_l(C_l)$ are, in this case, the decision priorities; no additional matrix manipulations are indicated. In this second, score based approach to MCDM, we could also have used direct substitution matrices in step 110 with appropriate modifications to the weight matrices $W_k$ and partition (1). To provide approximate invariance over substitution order, tool 100 replication over a sample of geometry altering permutations of the raw scores or ratings would be performed in accordance with FIG. 2 and our earlier discussions of replication.

Yet another approach to prioritizing (hierarchically arranged or clustered) paired comparison data using tool 100 is to define a longitudinal partition over the matrices of paired comparison preference data. More explicitly, the partition classes would consist of same index entries from the (lower triangular portions) of same level or same cluster criterion matrices. Priorities can then be found using tool 100 by (1) writing partition classes to ideal node or direct substitution matrices (step 110), (2) applying step 120 to find diagonal matrices $\text{diag}(A_l)$ and, (3) computing norms, $\|\text{diag}(A_l)\|$, on the set of diagonal vectors, $\text{diag}(A_l)$, to define priorities. (If an identification condition is not specified, then, as described earlier, the determinant or some other meaningful aggregation function can be applied instead to meaningfully compute priorities from the complexes $\text{diag}(A_l)$. Note, here we are using the subscript/ for both data object and (1)-partition; this should not cause any confusion.) In step 110, we can explicitly include criteria priorities in the form of weight matrices (as disclosed above) or criteria priorities can be applied post-hoc to the tool 100 priorities.

An advantage of tool 100 for MCDM is that heterogeneous, mixed measurement level data may be prioritized directly. This is not the case for other MCDM tools such as the Analytical Hierarchy Process that includes homogeneous data and the assumption that pairwise comparisons generate ratio scales.

Tool 100 is adaptive or contextual. Changes in a single data element may result in global changes in output. Tool 100 can be made progressively less contextual by fixing one or more coordinates of the reference configuration Z. This is easily done in the PROXSCAL based 2p-IDMDS algorithm. A natural choice in merging applications is to completely fixed Z coordinates as the vertices of a centered and normalized (N−1)-simplex in N-dimensions.

Fixing Z coordinates leaves only the deformation matrices $A_k$ and admissible transformations $g_l$ to be determined in step 120. A second method for decontextualizing tool 100 output is to insert fixed reference data objects or landmarks into each data set of interest. After processing, these landmarks may be used to standardize results across data sets. A third and straightforward option is to simply combine different data sets into a single analysis. This latter method can also be used for batch mode replication: Instead of processing samples separately, they are combined into a single super data set. This super data set is preprocessed and input to step 120. Step 120 output can then be analyzed by using average or centroid configurations with respect to the replicated data sets.

The processes described above for tool 100 can each be expanded and generalized in a number of ways. For example, with the exception of the application of tool 100 to MCDM, we have implicitly assumed that the weights $w_{ijk}$ in the modified energy functional $E_p$ are identically one. In one alternative embodiment, weights may be applied differentially to raw and transformed data values. Weights can be assigned a priori or derived from the input data itself. For example, if we suppose the data C is arranged in tabular or matrix form, then applying tool 100 to $C^t$, the transpose of C, associates a weight to each of the original rows $C_k$. Specifically, the scale conversion and merging process described above produces a scalar, merged value for each row of $C^t$ which is then used as the nonnegative weight for row $C_k$. A scalar value can also be achieved by simply setting the embedding dimension N=1.

For each of the tool 100 based merging processes described above, weights can be integrated directly into the merging process through the use of nontrivial proximity weights $w_{ijk}$ in equation (2) of step 120. Weights can also be applied in postprocessing step 130 through weighted statistical merging functions on transformed step 120 output. Which weighting method is selected depends on the data in question and the purpose of the analysis.

In another alternative embodiment, in the preprocessing step 110, data $C_k$ (matrices $M_k$) can be augmented with artificial values. For example, $C_k$ ($M_k$) may be augmented with missing values, repeated constants, or random values. The $C_k$ ($M_k$) may also be augmented through concatenation of copies of the data values themselves. Augmentation of the $C_k$ allows processing of data sets of differing cardinality and missing values. In conjunction with (1)-partitioning, augmentation greatly increases the kinds of data that may be processed by tool 100.

Minimization of the modified energy function $E_p$ is a constrained least squares approach to admissible geometrization. While the idea of energy minimization seems natural, admissible geometrization does not require a least squares objective function. Alternative embodiments have been identified including geometrization based on (constrained) least absolute differences, non-dimensional ordinal scaling (see Cunningham, J. P. and Shepard, R. N., "Monotone mapping for similarities into a general metric space," *J. Math. Psychol.*, 11, 1974, 335-363), and nonlinear principle components analysis (or Princals, see Gifi, A., "Algorithm descriptions for Anacor, Homals, Princals, and Overals," *Tech. Report No. RR*-89-01, Department of Data Theory, University of Leiden, 1989). However, embodiments of the present invention are more flexible and therefore have greater applicability than either non-dimensional scaling or Princals. $L^1$ or least absolute differences minimization is generally more difficult to implement than least squares minimization so an alternative embodiment of admissible geometrization through constrained $L^1$ optimization overcomes certain technical programming problems.

To further specify further the method and apparatus in accordance with embodiments of the present invention, the following descriptive examples of the application of the embodiments of the present invention follow. These examples are illustrative only and shall in no way limit the scope of the method or apparatus.

EXAMPLE A

Data Mining

Suppose company XYZ has an m client database which contains the following fields: (1) client age, (2) income (3) region of domicile, (4)-(6) Likert scale responses to survey questions concerning company service plan A, and (7) an indicator field showing which XYZ service plan, B or C, the client is using. Company XYZ has acquired new clients for whom they have information on fields (1) through (6) and they would like to predict which service plan, B or C, a new client will select. We apply the three step process of an embodiment of the present invention, tool 100.

Let $C_k = \{c_{k1}, \ldots, c_{k7}\}$ be the record for client k. Then we define m+1, 4×4 direct substitution matrices $T_k$ as follows $$C_k \rightarrow T_k = \begin{pmatrix} 0 & * & * & * \\ c_{k1} & 0 & * & * \\ c_{k2} & c_{k3} & 0 & * \\ c_{k4} & c_{k5} & c_{k6} & 0 \end{pmatrix},$$

where the $7^{th}$ field has been omitted and * denotes empty entries (recall, $T_k$ is hollow, lower triangular). The first m of these matrices correspond to previous XYZ clients whose $7^{th}$ field values are known. The (m+1)-th matrix represents a new client whose field 7 value is to be predicted. We next define a (1)-partition by fields, that is, partition class $C_l$ corresponds to field l, for l=1, ..., 6. Scale groups or scale types are assigned as follows: $G_1$ and $G_2$ are similarity groups defining ratio scale types; $G_3$ is $\Sigma_m$, the permutation group on m letters, defining nominal scale type; and $G_4$ through $G_6$ are isotonic groups defining ordinal scale types. (Note, had we assumed that the Likert scales in fields 4-6 were comparable, then we could combine partition classes $C_4$ through $C_o$ into a single ordinal scale class.) In this hypothetical application of embodiments of the invention, unit proximity weights can be assumed. However, if it turned out, for some reason, that age was a universally important variable in determining plan selection, one could assign a high value to proximity weight $w_{21k}$ for each client record k.

Since direct substitution encoding is not invariant under substitution reorderings, we create 6!=720 replications or rearrangements of the above matrices and partitions which will be processed in step 120 and averaged over in step 130. (Note, we do not really need to create 6! replications since 4! of these will not alter the admissible geometry in step 120.) If weight matrices are involved, these can be permuted accordingly.

In step 120, the m+1 matrices $T_k$ and admissible transformation information $G_l$, l=1, ..., 6, are submitted to the 2p-IDMDS algorithm with the following specifications: (i) embedding dimension N=3, and (ii) the deformation matrices $A_k$ in constraint equations (3) are diagonal (the INDSCAL model of traditional IDMDS) with identification condition (4) enforced. We also designate that transformed data values or pseudo-distances are to be standardized within, rather than across, partition classes. A number of other technical 2p-IDMDS parameters also can be set, for example, one can select to treat the ordinal data from fields 4-6 as either continuous or discrete (as mentioned above, this corresponds to so-called primary and secondary approaches to ties in IDMDS, though in 2p-IDMDS we can specify different approaches to ties for each ordinal class $C_j$). We can also decide on the convergence criteria, minimum energy 4, and the maximum number of iterations to allow.

Step 120 is repeated on each of the 720 replications constructed in step 110. The output for each of these replications is a set of dilation vectors diag(A)={diag($A_k$)} which, because of identification condition (4), defines a set of 3—vectors or points in the positive orthant of $R^3$. These 720 sets of dilation vectors are then averaged by calculating the geometric mean over dimensions. We abuse notation and write this averaged set of vectors as diag(A), as well.

Step 130 postprocessing is based on statistical clustering analysis of diag(A), the merged classification space of dilation 3-vectors. This is one of a number of ways to analyze this and real databases, but it is a very natural approach, as we will discuss shortly. The first m of the vectors in diag(A) are divided into two disjoint groups according to their known field 7 values. The goal is to predict the unknown field 7 value for the (m+1)-th client vector using the spatial organization of the set diag(A) in $R^3$ and the field 7 differential marking of the initial m vectors. While there are a number of ways in which this clustering analysis can be carried out, a natural choice are multiresponse permutation procedures or MRPP (see Mielke, P. W. and Berry, K. J., *Permutation Methods: A Distance Function Approach*, Springer, N.Y., 2001). MRPP allows classification of an additional object, in this case, the (m+1)-th client, into one of the two disjoint groups of field 7 distinguished vectors or clients. We will not describe the MRPP methodology here except to point out that MRPP, as its name suggests, determines the probability that an additional object belongs to a particular group by computing P-values using permutation procedures. In addition, MRPP allows for classification with an excess group. The excess group can be used to identify anomalous objects or outliers in the tool 100 classification space, diag(A).

The use of MRPP in the postprocessing step 130 of embodiments of the present invention is natural in the sense that MRPP is a model free, (Euclidean) distance function approach to statistical analysis and embodiments of the present invention are, among other things, a model free technique for transforming data, in particular, messy, intermixed scale type data into geometric (Euclidean, in the presently preferred embodiment) configurations of points.

The optimal choice for 2p-IDMDS embedding dimension can be found using a training set of clients with known field 7 values. The most perspicacious dimension may be found by back testing the training set holdouts over a range of dimensions. The optimal training set dimensions are then used for predicting field 7 values for new clients.

EXAMPLE B

Response Modeling

While example A refers to a classification problem, MRPP P-values can be used to order any number of objects with respect to many kinds of criteria. It is a simple matter to recast example A as a response modeling problem: Let field 7 indicate response or no response to a direct marketing campaign. Then the MRPP determined P-values for "new clients" on the marked classification space, diag(A), indicate the probability that a person (new client) will respond to a solicitation. It is then straightforward to construct a lift table from the list of "new clients" sorted by MRPP determined response probability or P-value.

EXAMPLE C

Anomaly Detection

Example A can also be reinterpreted in terms of time series, signals, or sequential data. The data objects $C_k$ are now data sequences, for example, process traces from a computer server. The sequences $C_k$ can be processed by tool 100 in precisely the same manner as disclosed in example A only now field 7 represents some characteristic or labeling of the sequence. In the case of process traces this label might indicate whether the given process trace represents benign behavior or an intrusion or attack. The (m+1)-th sequence or "client" is a monitored process or signal. In this case, MRPP classification of this monitored process into an excess group indicates the occurrence of some sort of anomalous behavior. The relative size of the associated P-values for excess and non-excess groups indicate the degree of certainty that anomalous behavior has or is occurring.

From the foregoing, it can be seen that the illustrated embodiments of the present invention provide a method and apparatus for classifying, converting, and merging possibly intermixed measurement level input data. Input data are received and formed into one or more matrices. Furthermore, intermixed measurement level input data is partitioned into classes and scale groups. Matrices are processed by 2p-ID-MDS to produce decomposition of modified energy, deformation matrices, and transformed data values. A back end or postprocessing step, organizes, decodes, interprets, and aggregates process step output. The technique in accordance with embodiments of the present invention avoids limitations associated with earlier applications of energy minimization for classification, conversion, and aggregation of data, extending these earlier processes to intermixed measurement level data and further applications.

Additional illustrative embodiments of the present invention can apply to voter preference and grading or scoring of assessment instruments.

Let $C=\{C_1, \ldots, C_m\}$ denote a group of m voters and let $C_k=\{c_{k1}, \ldots, c_{kn}\}$ be the preferences of voter k for each of n candidates or choices (large values of $c_{ki}$ correspond to. The three-step process of the present embodiment of tool 100 may be used in a number of ways to determine a group ordering or preference of the n candidates or choices. In one approach, the ordinal preferences of each voter $C_k$ are written to direct substitution matrices $M_k$ with trivial partition C. This preprocessing step 110 may be replicated one or more times over rearrangements of the substitution order where the number of replications is determined by the requirements of the data set C and appropriate statistical reliability analyses. Each replication is then submitted to the processing step 120 of the presently preferred embodiment of tool 100. In step 120, admissibly transformed values or pseudo-distances $\hat{c}_{ki}$ are produced for each voter preference $c_{ki}$. In one embodiment of the invention, admissibly transformed values $\hat{c}_{ki}$ are found using monotone regression in the 2-phase transformation portion of 2p-IDMDS. In step 130 of tool 100, the replicated transformed values $\hat{c}_{ki}$ are collected, made commensurate (if indicated by the analysis or data), and merged. The merged replicated transformed values are then aggregated by candidate, defining a group preference on the set of candidates or choices.

In an alternative approach, the voter group C is thought of as defining a rectangular m by n matrix. The rows of the transpose of this matrix are then submitted to the three step process described in the preceding paragraph where now the direct substitution matrices are n in number, one for each candidate or choice. As in the previous paragraph, the trivial partition is selected with possible replication and step 120 processing applied in a manner analogous to that described above. In the postprocessing step 130, there are at least two methods for determining group preferences. The first is similar to the previous description: admissibly transformed data are made commensurate (if indicated) and merged across replications, then the merged replicated transformed values are merged by candidate where now candidate admissibly transformed values are grouped together. In a second approach, deformation matrices $\{A_k\}$ are collected from step 120 and are meaningfully averaged or merged over replications. The merged replication deformation matrices are then measured for size, where the matrix function determining the size of the deformation matrices depends on the form of the constraint equation $X_k=ZA_k$. For example, if the $A_k$ are diagonal and satisfy an identification condition, then size of the $A_k$ can be defined as $\|\mathrm{diag}(A_k)\|$, the norm of the vector formed by the diagonal entries of $A_k$. The size of the matrix $A_k$ is interpreted to be the group preference for candidate or choice k.

Embodiments of the present invention can also be applied to grade or score subject performance on various assessment instruments including standardized tests, aptitude and achievement exams, the SAT, graduate record exams, intelligence tests, personality, placement, and career inventories, and other instruments.

In one illustration, let the data set $C=\{C_1, \ldots, C_m\}$ denote a group of m subjects and the sets $C_k=\{c_{k1}, \ldots, c_{kn}\}$ consist of zero/one values with zero (one) indicating an incorrect (correct) response by subject k on each of n items or questions in a test or assessment instrument. In addition, let $W_k=\{w_{k1}, \ldots, w_{kn}\}$ be proximity weights representing the difficulty levels of the n items or questions. (Other information or testing data may be encoded in the sets $C_k$ including, for instance, human or automatic grader scores on n questions for individual k. The present embodiment of the invention may be easily adapted to these and other data sets by one skilled in the art.)

The three-step process of the presently preferred embodiment of tool 100 may be used to determine a test score or grade for each of the above m subjects $C_k$ in a number of ways. In one approach, in step 110 of tool 100, the nominal responses of each subject $C_k$ are written to direct substitution matrices $M_k$ with trivial partition C. (Binary values may also be treated as ratio scale type data.). Preprocessing step 110 is replicated over rearrangements of substitution order of the elements of the subjects $C_k$ with the number of replications determined by the data set C and the results of statistical analyses. Each replication is then submitted to step 120 of the presently preferred embodiment of tool 100. In step 120, weighted admissibly transformed values or pseudo-distances $\hat{c}_{ki}$ are found for each subject response $c_{ki}$. In the presently preferred embodiment of the invention, the process step 120 consists of 2p-IDMDS with 2-phase nominal transformations and possibly nontrivial (non-unit) proximity weights. In step 130 of tool 100, the replicated transformed values are collected, made commensurate (if indicated by the analysis or data), and merged. The merged replicated transformed values are then aggregated by subject defining an overall subject grade or test score. In a second approach, deformation matrices $\{A_k\}$ produced in step 120 of tool 100 are meaningfully averaged or merged over replications (for example, using the dimension-wise geometric mean). The merged replication deformation matrices are then measured for size, where the matrix function determining the size of the deformation matrices depends on the form of the constraint equation $X_k=ZA_k$. For example, if the $A_k$ are diagonal and satisfy an identification condition, then the size of the $A_k$ can be defined as $\|\mathrm{diag}(A_k)\|$, the norm of the vector formed by the diagonal entries of $A_k$. The size of the matrix $A_k$ is interpreted as the grade or test score for subject k.

Scoring or grading assessment instruments according to the above description of the presently preferred embodiment of the invention is contextual or relative. A pool of subjects and subject test scores can be maintained against which new subjects may be scored or graded. More specifically, if B is a set of baseline test subjects, then an individual $C_k$ (or group C) may be scored against this baseline group by applying the above tool 100 three-step procedure to the union $C_k \cup B$ (or $C \cup B$).

The application of the present embodiment of the invention may be modified to include proximity weight matrices $W_k$ in tool 100 determination of group voter preference or choice. In addition, the above voter and assessment analyses can be performed in a symmetric, or rearrangement invariant manner, by using ideal node transformation in preprocessing step 110.

In general, the admissibly transformed values produced by step 120 of tool 100 may be meaningfully processed by a univariate or multivariate statistical technique that is meaningful on interval or weaker scale types. In this way, the group preferences or subject test scores produced by tool 100, as described above, can be treated as univariate or multivariate interval or stronger scale complexes (or vectors if appropriate identification conditions have been imposed on the constraint equations (4)).

While one or more particular embodiments of the present invention have been shown and described, modifications may be made. As described above, geometrization algorithms based on other objective functions may replace 2p-IDMDS. It is therefore intended in the appended claims to cover all such changes and modifications that fall within the true spirit and scope of the invention.

The invention claimed is:

1. A computer system for data scaling comprising:
   (a) a memory which is able to store data,
   (b) a processor which is operatively connected to the memory which will:
      (1) compute two partitions of the stored data, and
      (2) compute admissible geometrization on the two partitions of the stored data, and
      (3) compute admissibly transformed data so that said memory will store the transformed data, and
   (c) a display to display the transformed data to a user to interpret the stored transformed data as transformed data.

2. The computer system for data scaling of claim 1 wherein the memory stores data selected from the group consisting of qualitative data, quantitative data, intermixed qualitative and quantitative data, and intermixed scale type data.

3. The computer system for data scaling of claim 1 wherein in step (b2) the processor computes 2-partition individual differences multidimensional scaling on the two partitions of the stored data.

4. The computer system for data scaling of claim 1 wherein the memory stores data selected from the group consisting of: classified data for a predetermined characteristic among a plurality of input domains, measured data for a predetermined characteristic among a plurality of input domains, survey data for a predetermined characteristic among a plurality of input domains, scoring data for a predetermined characteristic among a plurality of input domains, rating data for a predetermined characteristic among a plurality of input domains, ranking data for a predetermined characteristic among a plurality of input domains, preference data for a predetermined characteristic among a plurality of input domains, voting data for a predetermined characteristic among a plurality of input domains, and grading data for a predetermined characteristic among a plurality of input domains.

5. A method for quantitative aggregation of data comprising:
   (a) using a computer processor, receiving data;
   (b) forming two partitions of the received data;
   (c) applying admissible geometrization to the partitioned data to produce at least a plurality of deformation matrices;
   (d) computing sizes of the deformation matrices; and
   (e) interpreting the sizes of the deformation matrices as indicative of quantitative aggregation of the received data.

6. The method for quantitative aggregation of data of claim 5 wherein the received data is heterogeneous data.

7. The method for quantitative aggregation of data of claim 6 wherein the heterogeneous data is selected from the group consisting of qualitative data, quantitative data, intermixed qualitative and quantitative data, and intermixed scale type data.

8. The method for quantitative aggregation of data of claim 5 wherein applying admissible geometrization to the partitioned data comprises applying 2-partition individual differences multidimensional scaling to the partitioned data.

9. The method for quantitative aggregation of data of claim 5 further comprising the steps of: (b1) forming a plurality of rearrangements of the partitioned received data; (c1) applying admissible geometrization to the plurality of rearrangements of the partitioned received data to produce a plurality of deformation matrices for the rearrangements of the received data; (d1) computing aggregate sizes of the deformation matrices for the rearrangements of the received data; and (e1) interpreting the aggregate sizes of the deformation matrices as indicative of quantitative aggregation of the received data.

10. A computer system for quantitative aggregation of data comprising:
    (a) a memory which is able to store data,
    (b) a processor which is operatively connected to the memory which will:
       (1) compute two partitions of the stored data, and
       (2) compute admissible geometrization of the partitioned data, and
       (3) compute at least a plurality of deformation matrices, and
       (4) compute sizes of the plurality of deformation matrices so that said memory will store the sizes of the deformation matrices, and
    (c) a display to display the sizes of the deformation matrices to a user to use the stored sizes of the deformation matrices as indicative of quantitative aggregation of the received data.

11. The computer system for quantitative aggregation of data of claim 10 wherein the memory stores data that is heterogeneous data.

12. The computer system for quantitative aggregation of data of claim 11 wherein the heterogeneous data is selected from the group consisting of qualitative data, quantitative data, intermixed qualitative and quantitative data, and intermixed scale type data.

13. The computer system for quantitative aggregation of data of claim 10 wherein in step (b2) the processor computes 2-partition individual differences multidimensional scaling on the two partitions of the stored data.

14. The computer system for quantitative aggregation of data of claim 10 further comprising the steps of: (b1) the processor computes a plurality of rearrangements of the partitioned received data, and (b2) the processor computes admissible geometrization of the plurality of rearrangements of the partitioned received data, and (b3) the processor computes a plurality of deformation matrices for the rearrangements of the received data, and (b4) the processor computes aggregate sizes of the plurality of deformation matrices for the rearrangements of the received data so that the memory will store the aggregate sizes, and (c1) a display to display the aggregate sizes of the deformation matrices to a user to use the stored aggregate sizes of the deformation matrices as indicative of quantitative aggregation of the received data.

15. A pattern recognition method comprising:
    (a) using a computer processor, receiving data;
    (b) forming two partitions of the received data;
    (c) applying admissible geometrization to the partitioned data to produce at least a plurality of deformation matrices;

(d) analyzing the plurality of deformation matrices; and
(e) using the analyzed deformation matrices for pattern recognition;
wherein the deformation matrices comprise an output of the step of applying admissible geometrization to the partitioned data.

16. The pattern recognition method of claim 15 wherein the received data is heterogeneous data.

17. The pattern recognition method of claim 16 wherein the heterogeneous data is selected from the group consisting of qualitative data, quantitative data, intermixed qualitative and quantitative data, and intermixed scale type data.

18. The pattern recognition method of claim 15 wherein applying admissible geometrization to the partitioned data comprises applying 2-partition individual differences multidimensional scaling to the partitioned data.

19. A computer system for pattern recognition comprising:
(a) a memory which is able to store data,
(b) a processor which is operatively connected to the memory which will:
  (1) compute two partitions of the stored data, and
  (2) compute admissible geometrization of the partitioned data, and
  (3) compute at least a plurality of deformation matrices, and
  (4) compute an analysis of the plurality of deformation matrices so that said memory will store the analysis of the deformation matrices, and
(c) a display to display the analysis of the deformation matrices to a user to use the stored analysis of the deformation matrices for pattern recognition;
wherein the deformation matrices comprise an output of the step of computing admissible geometrization of the partitioned data.

20. The computer system for pattern recognition of claim 19 wherein the memory stores data that is heterogeneous data.

21. The computer system for pattern recognition of claim 20 wherein the heterogeneous data is selected from the group consisting of qualitative data, quantitative data, intermixed qualitative and quantitative data, and intermixed scale type data.

22. The computer system for pattern recognition of claim 19 wherein in step (b2) the processor computes 2-partition individual differences multidimensional scaling on the two partitions of the stored data.

* * * * *